United States Patent [19]

Weingartner

[11] Patent Number: 4,594,729

[45] Date of Patent: Jun. 10, 1986

[54] METHOD OF AND APPARATUS FOR THE STEREOPHONIC REPRODUCTION OF SOUND IN A MOTOR VEHICLE

[75] Inventor: Bernhard Weingartner, Feldkirch-Vorarlberg, Austria

[73] Assignee: Neutrik Aktiengesellschaft, Schaan, Liechtenstein

[21] Appl. No.: 486,701

[22] Filed: Apr. 20, 1983

[30] Foreign Application Priority Data

Apr. 20, 1982 [AT] Austria ................................ 1543/82

[51] Int. Cl.[4] .......................... H04B 1/00; H04R 5/00

[52] U.S. Cl. ........................................ 381/18; 381/24; 381/86

[58] Field of Search ....................... 381/17, 18, 24, 25, 381/27, 22, 86

[56] References Cited

U.S. PATENT DOCUMENTS

| | | | |
|---|---|---|---|
| 3,491,204 | 1/1970 | Sherno | 381/24 |
| 3,892,917 | 7/1975 | Sotome | 381/17 |
| 3,959,590 | 5/1976 | Scheiber | 381/22 |
| 4,132,859 | 1/1979 | Ranga | 381/18 |

FOREIGN PATENT DOCUMENTS 2074427 10/1981 United Kingdom .

OTHER PUBLICATIONS

"Separates for Your Car", *High Fidelity* Magazine, Dec. 1978, Angus, pp. 87–89.

"S 608 AM-FM/8 Track Player", *Stereo Catalog* 1979, pub. by Ziff-Davis Pub. Co., p. 136.

Radio Shack Catalog, 1980, p. 70.

*Primary Examiner*—R. J. Hickey

*Attorney, Agent, or Firm*—Toren, McGeady, Stanger, Goldberg & Kiel

[57] ABSTRACT

In providing stereophonic reproduction of sound in the passenger space of a motor vehicle, a pair of speakers are located at the opposite ends of the dashboard ahead of the driver, one for reproducing the left signal of a sound recording and the other for reproducing the right signal. In addition, at least one of a summation signal made up of the left signal and the right signal is provided from a speaker located at the dashboard between the pair of speakers, and a differential signal, made up of the left signal and the right signal, is directed forwardly from the rear of the passenger space. Further, the differential signal can be made up only of middle and lower frequencies supplied to one rear speaker with another rear speaker turned 90° relative to the one rear speaker and radiating the differential signal to opposite sides of the passenger space. An electronic delay can be incorporated into the rear speakers.

6 Claims, 6 Drawing Figures

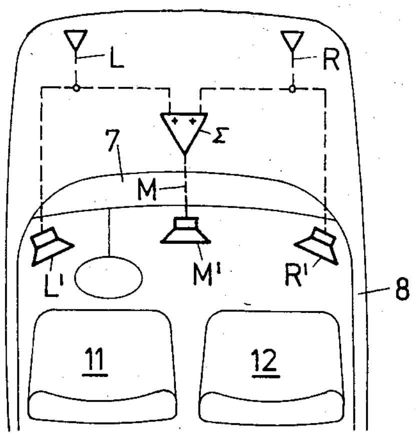
Fig.2
Fig.6
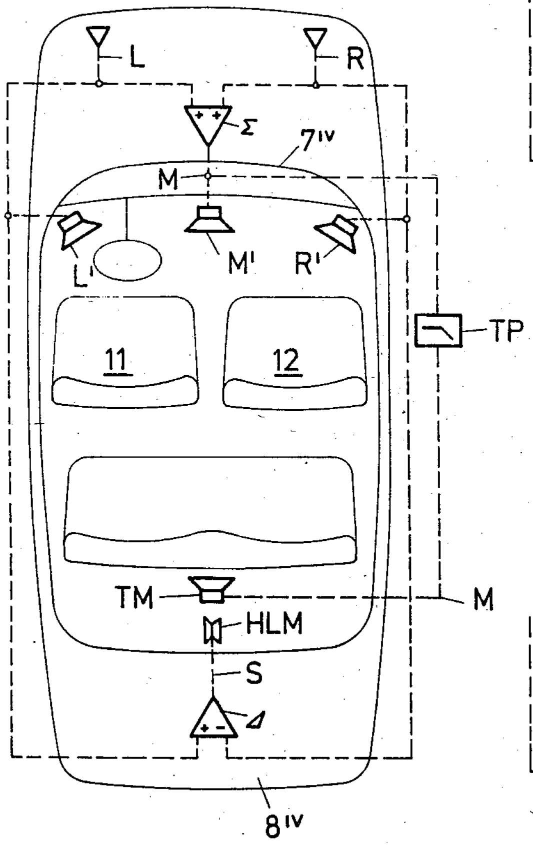
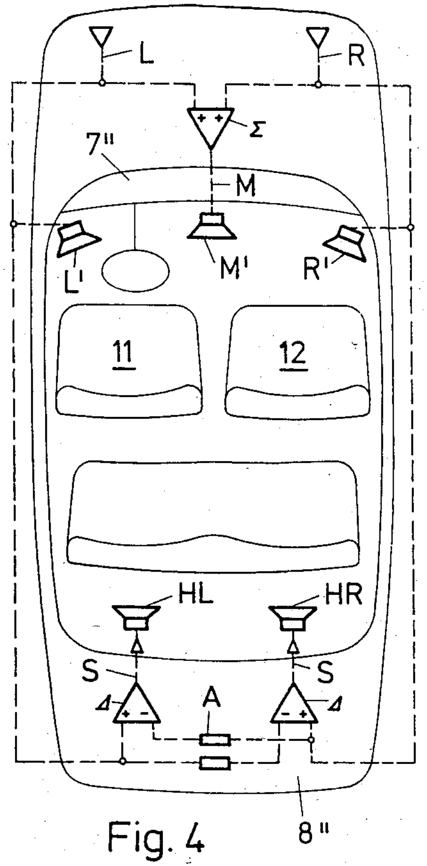
Fig. 4
8''
Fig. 5
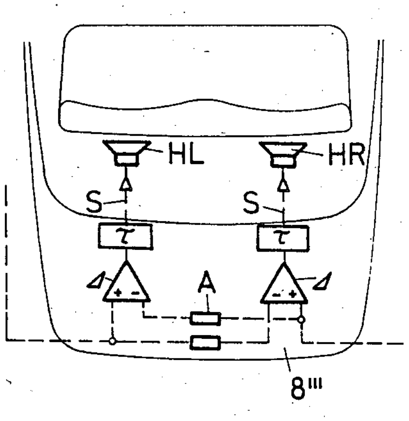

METHOD OF AND APPARATUS FOR THE STEREOPHONIC REPRODUCTION OF SOUND IN A MOTOR VEHICLE

SUMMARY OF THE INVENTION

The present invention is directed to a method of and apparatus for the stereophonic reproduction of sound in the passenger space of a motor vehicle, preferably a passenger motor vehicle, with at least one receiving or reproduction device and several speakers. At least two speakers are provided in the region of the driver's seat and the adjacent passenger seat and the speakers are spaced apart from one another with one of them serving to reproduce the left signal and the other reproducing the right signal.

The electro-acoustic recording, transmission and reproduction of sound from a chamber where the sound is produced into a reproduction space via two separate channels makes it possible, in a known manner, to transmit directional impressions and to produce spatial sound impressions, with respect to reproduction, corresponding to the human ability to hear spatially through both ears.

With the aid of such so-called stereophonics, it is possible, for example, to localize sound sources in the reproduction space according to direction and distance or to appreciate a body of sound in its spatial arrangement. The simplest transmission system for such a stereophonic system is made up of two directional microphones whose main sensitivity direction covers an angle of approximately 90° to 120° with the plane of symmetry of the microphone arrangement and of the body of sound approximately coinciding. Further, the transmission system includes corresponding memories, multiplex parts, amplifiers, decoders and the like, as well as two speakers arranged at a distance from one another. The stereophonic effect is based on the following: for each sound incidence direction and each frequency group of the original sound source, there is a determined level distance between the two channels and, accordingly, at the location of the listener there is a determined sound pressure difference for the sound originating from the right or left speaker, respectively. The ear assigns a predetermined direction to this pressure difference and localizes the so-called phantom sound source. In addition, though it is of slight importance in the present case, the ear also takes into account the delay differences in time for such localization, however, it is necessary that the recording microphones be positioned at a predetermined distance from one another.

Accordingly, it can be appreciated that a satisfactory stereophonic reproduction can only be attained in a determined area or field between the two speakers, that is, the so-called stereophonic auditory field which is determined, among other things, by the pressure differences which are produced a priori through the distance differential of the listener relative to the two speakers based on the natural sound pressure drop in radiation which do not exceed a determined minimum dimension and, accordingly, cover the distances needed and available for the spatial auditory impression.

When one envisions the arrangement within a motor vehicle, based on its construction, the speakers are, of necessity, located near the driver or the adjacent passenger seat and it readily follows that there are two listening locations, in addition to the rear passenger seats, which, as a rule, are located outside of the above-mentioned stereophonic auditory field and, because of the prevailing lack of symmetry, a satisfactory stereophonic reproduction is excluded from the outset.

Another difficulty is that the interior of a motor vehicle is generally quite small and is very severely dampened. Therefore, it has not been possible up to the present time to construct a reproduction sound field which spatially and for a given time approximates the original sound field to some extent. It is much more possible to construct such a sound field in a room within a building. In addition to the direct sound in time sequence, there are a large number of sound reflections which originate from the boundary surfaces of the room and indicate the size of the room and then, while becoming increasingly dense, change into diffuse reverberation.

To improve the stereo listening conditions in a motor vehicle, separate stereo reproduction systems can be provided in the passenger space for the driver's seat and the adjacent front passenger seat. As a result, a doubling of the stereo reproduction system would be required in automobiles, once for the driver and a second time for the passenger. Such an arrangement is, of course, extremely expensive and impractical.

Therefore, the primary object of the present invention is to provide substantial improvements for overcoming the problems mentioned above. In accordance with the present invention, a summation signal is formed from the right and left signals received from a body of sound and the signals are radiated between two speakers disposed in spaced relation and/or at least one differential signal formed from the right and left signals is radiated from the rear of the passenger space.

A stereophonic reproduction system for carrying out this operation is characterized by an additional speaker located between the two speakers and positioned approximately on the central long axis of the motor vehicle forwardly of the front seats, that is, in the middle of the dashboard. This centered speaker is provided with the electrical summation signal from the right and left channels and/or at least one rear speaker is provided arranged in the back portion of the passenger space and it is provided with the electrical differential signal from the right and left channels.

Another advantageous feature of the present invention involves the use of one rear speaker provided with the differential signal having an approximately figure-8-shaped radiation pattern or characteristic (radiator of the first order or sequence) and it is arranged approximately on the central longitudinal axis of the motor vehicle and the main radiation direction is oriented approximately at a right angle and horizontally relative to the longitudinal axis. Moreover, an additional undirected or non-directional rear speaker is provided in the region of the first rear speaker and it is provided with the electrical summation signal preferably formed from the signal portion of the middle and, especially, the low frequency ranges.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIGS. 2 to 6 are schematic showings of various wiring diagrams of systems embodying the present invention in passenger motor vehicles.

DETAIL DESCRIPTION OF THE INVENTION

Figure 1:
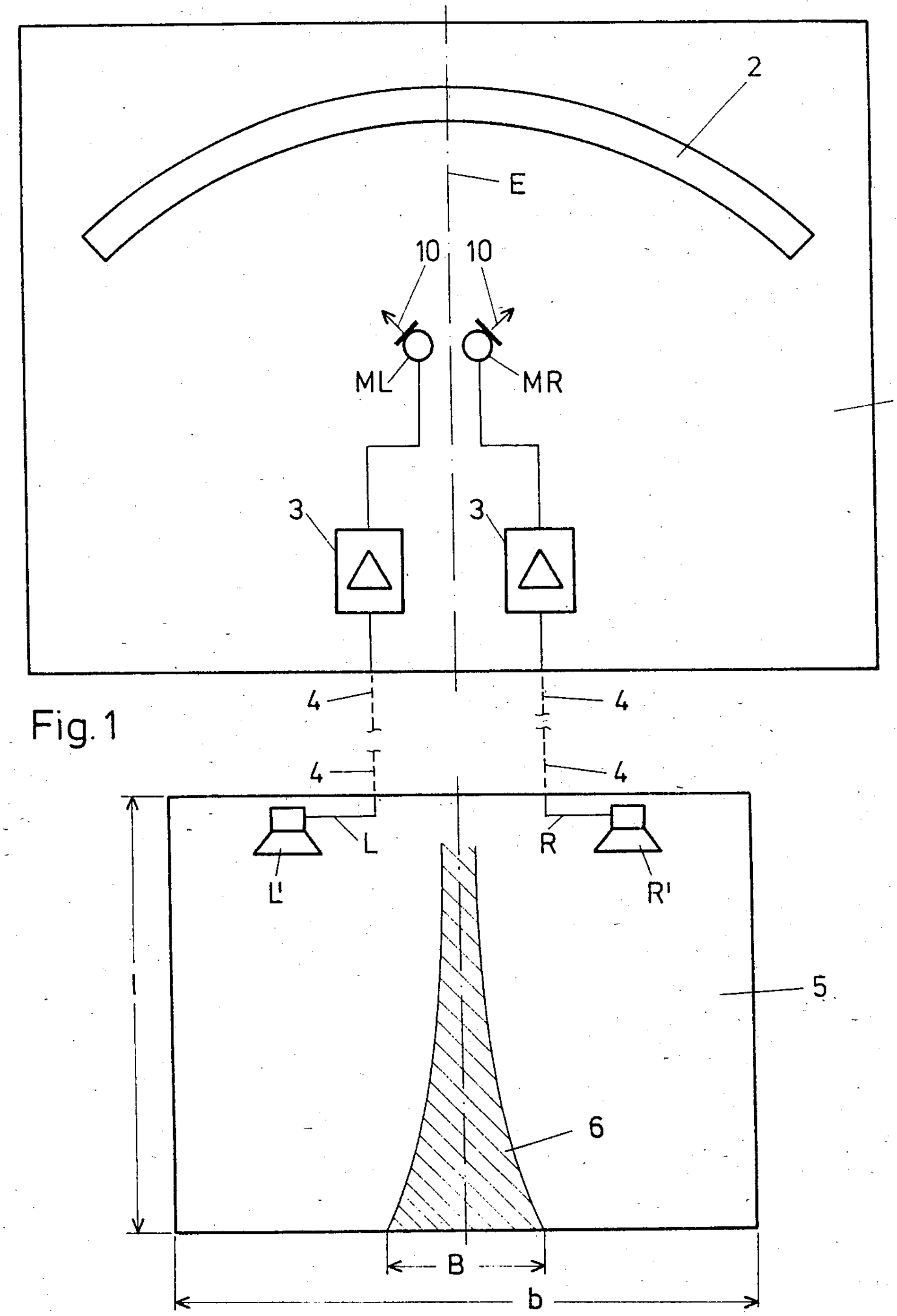
FIG. 1 is a schematic view of an arrangement for reproducing sound.

FIG. 1 shows schematically and in outline a body 2 for producing sound, such as an orchestra, located within a recording chamber 1. Two microphones ML, MR with main sensitivity directions covering an angle of approximately 90°, are located in close proximity to one another and in front of the body 2. The arrows 10 extending from the microphones ML, MR, indicate the main sensitivity direction. A plane of symmetry E defines the plane of symmetry of the two microphones ML and MR which approximately coincides with the plane of symmetry of the body 2. Each of the microphones ML, MR, has an amplifier and a transmission device 3 assigned to it. Cables 4 lead from the device 3 into a reproduction space 5 and within the space are connected with speakers L′, R′. Microphone ML and speaker L′ receive and radiate the left signal L while microphone MR and speaker R′ receive and radiate the right signal R. The hatched area 6 in the center of the reproduction space 5 represents the stereophonic listening field. A listener located in this field 6 hears the reproduced sound stereophonically and such effect can only be achieved within this listening field. With a room length l and a room width b of approximately 5 meters, the greatest width of the field 6 amounts to approximately 0.5 m.

In FIG. 2 a schematic top view is shown of the opened passenger space in a motor vehicle 8. In the region of the windshield or dashboard 7, three speakers L′, R′ and M′ are arranged forwardly of the front seats 11, 12. Speakers L′, R′ are located at the opposite ends of the dashboard 7 and could possibly be installed in the motor vehicle doors. Speaker M′ is located between the other two speakers on the central longitudinal axis of the motor vehicle 8. Speaker L′ is provided with the signal L of the reproduced left channel, speaker R′ is provided with the signal R of the reproduced right channel and the center speaker M′ is provided with an electrical summation signal $M=L+R$, the result of the electrical addition of the signals L, R of the right and left channels, as employed for producing a monophonic, that is, one-channel, signal from the two stereo systems. As is known, it is necessary that stereo recordings be monophonically compatible, that is, that monophonic signals can be produced by the addition of the two stereo signals, which monophonic signals are free from disturbing acoustic defects, such as, interferences. This combination can also be achieved on the acoustic side by means of a corresponding expense in apparatus. In accordance with the present invention, however, signals L, R of the two channels are added, on the electrical side, in a suitable amplifier Σ and the summation signal M is directed from the single speaker M′ as illustrated in FIG. 2. In addition, it is possible to make use of the fact that substantial directional information is contained only in the middle and higher frequency ranges, approximately from 250 Herz, and, as a result, only these frequency ranges need to be radiated by all three speakers L′, M′ and R′, whereas the bass range can be radiated either by the middle speaker M′ or through the two side speakers L′, R′.

Figure 3:
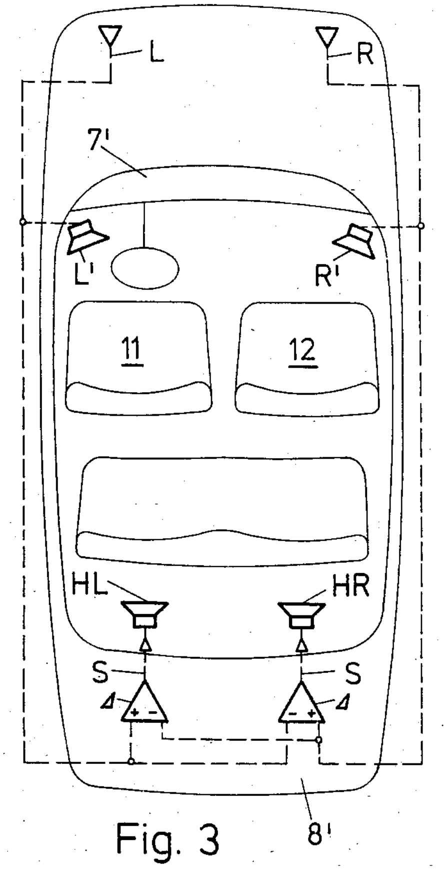

A stereophonic listening impression, though perhaps less satisfactory, can be provided in the system shown in FIG. 3. The two speakers L′, R′ for the left and right signals are positioned exclusively at the dashboard 7′, two rear speakers HL, HR radiate respective differential signals $S=L-R$ and $S=R-L$. Differential amplifiers Δ are provided to form these signals.

Another possibility for improving the stereophonic reproduction in a motor vehicle can be achieved if the spatiality of the sound impression is improved, that is, if, in addition to direct sound, time offset reflections or diffuse sound, respectively, are also radiated, such as occurs in auditoriums and other chambers where the reflecting boundary surfaces of the chamber define such a sound field. Such an effect is not directly possible in the interior of a motor vehicle because of the unusually small volume and the dampening effect of the boundary surfaces of the passenger space which dampening is usually very considerable. Furthermore, the sound reproduction in known systems using so-called rear or tail speakers, such speakers radiate the signals of the right and left channels directly from the rear in a very unnatural manner.

In the system displayed in FIG. 4, two tail or rear speakers HL and HR are located in the motor vehicle 8″ along with the three front speakers L′, M′ and R′, as well as the differential amplifiers Δ and, in another embodiment, attenuators A which enable the level of the channels to be reduced by an adjustable or desired amount (approximately 3–6 dB).

Signals are supplied to the two rear speakers HL, HR which are the result of the differential of the left and right signals (L−R) and of the right and left signals (R−L), respectively. This measure eliminates all correlated signals L, R of the left and right channels which correspond to the direct sound and only the uncorrelated signals, corresponding to the diffuse sound field, are radiated. These signals are also called the "side signals". Tests have revealed that these sound signals produce a considerable improvement in the spatial impression, however, the reproduced sound is a little unnatural and thin because it radiates close to the ears of the rear passengers.

Another feature of the present invention which has proved to be useful is where the differential signal S is radiated via a left rear speaker HL and a right rear speaker HR, however, the left speaker HL is supplied with a little more of the left signal (3–6 dB) and the right speaker HR is supplied a little more of the right signal. The attenuators A, shown in FIG. 4, serve this purpose and the signals supplied to the rear speakers HL and HR can be represented as follows:

$S=nL-R$ and $S=nR-1$, respectively, wherein n is greater than 1.

Another arrangement, according to the present invention, in addition to the above-mentioned differential signal S for the middle and lower frequencies, which contain less direction information, the middle signal M is radiated without direction from the middle of the rear end of the motor vehicle $8^{IV}$ (FIG. 6) via single midrange speaker TM with a low-pass filter TP which is connected in series with it, and the differential signal S is turned 90° and radiates toward the two opposite sides of the rear end of the motor vehicle $8^{IV}$, which can be achieved by a so-called radiator of the first order, that is, a speaker HLM located in an open housing in which the front and rear sides of the membrane are coupled in the air, note FIG. 6. The two rear speakers TM and HLM are located substantially on the central longitudinal axis of the motor vehicle and are positioned one behind the other relative to the long direction.

A further improvement of the spatiality impression can be achieved if the differential signal S is delayed by approximately 5 to 20 milliseconds by a suitable electronic delay device $\tau$, for example, a so-called bucket brigade device, and then radiated. The localization of the rear speaker is apparently offset in depth by this arrangement, note FIG. 5.

It should be noted again that it is substantially sufficient, in the above-described measures according to the invention, to restrict only to the middle and high frequencies, so that it is only sufficient for the low frequencies to be radiated either from the front side speakers or from the front center speaker or from a rear center speaker. It has been found to be less advantageous to radiate the low frequencies from the two rear side speakers. In practice, the present invention can be carried out in a number of ways. It is possible to employ the installation methods common at the present time for automobile speakers which merely combine these methods, in accordance with the present invention, with the intermediary of suitable and known summation and differential amplifiers.

For example, in an arrangement which has proven to be successful in practice, the left signal L and right signal R are radiated in a broad banded manner via the usual commercial door speakers, while the middle signal $M=R-L$ is radiated, according to the invention, via a small auxiliary speaker (only for high and middle frequencies), which can be simply attached to the dashboard and can also contain the required electronics. In addition, the two rear speakers, which are usually present in an exacting stereo system, can be acted upon by the differential signals in accordance with the suggestion.

The improvement of the stereo reproduction achieved with with arrangement, as well as the natural spatiality, is extremely convincing and a presently existing system can be supplemented without any great expense.

While specific embodiments of the invention have been shown and described in detail to illustrate the application of the inventive principles, it will be understood that the invention may be embodied otherwise without departing from such principles.

I claim:

1. Stereophonic reproduction system for the passenger space in a motor vehicle, such as a passenger vehicle having a front end region forwardly of the driver and a rear end region behind the passenger space with a central longitudinal axis dividing the passenger space between the front end region and the rear end region, the front end region and the rear end region each having a left side and a right side located on opposite sides of the central longitudinal axis, comprising at least one of a receiving device and a reproduction device, and a plurality of speakers, at least two of said speakers spaced laterally from one another in the front end region of the passenger space forwardly of the seats in the passenger space and arranged so that one of the two said speakers is located on the left side and reproduces the left signal of a recorded sound and directs it into the passenger space and the other one of the two said speakers is located on the right side and reproduces the right signal and directs it into the passenger space, a third speaker located approximately on the central longitudinal axis between the at least two of said speakers in the front end region of the passenger space and in the front of the seats in the passenger space, means for supplying said third speaker with an electrical summation signal of the left and right signals, and at least one rear speaker located in the rear end region of the passenger space behind the seats in the passenger space, and means for supplying the electrical differential signal ($S=L-R$ and $S=R-L$, respectively) of said right and left signals to said at least one rear speaker, at least two said rear speakers are located in the rear end region and spaced laterally apart with one said rear speaker located on the left side and another said rear speaker located on the right side of the rear end region, said means for supplying the electrical differential signal supplies the differential signal to said left side and right side rear speakers and the differential signal for said left side rear speaker has the portion of the differential signal from the left signal stronger than the portion of the signal from the right signal and the differential signal for said right side rear speaker has the portion of the differential signal from the right signal stronger than the portion of the left signal.

2. Stereophonic reproduction system for the passenger space in a motor vehicle, such as a passenger vehicle having a front end region forwardly of the driver and a rear end region at the back of the passenger space with a central longitudinal axis dividing the passenger space between the front end region and the rear end region, the front end region and the rear end region each having a left side and right side located on opposite sides of the central longitudinal axis, comprising at least one of a receiving device and a reproduction device, and a plurality of speakers, at least two of said speakers spaced laterally from one another in the front end region of the passenger space and arranged so that one of the two said speakers is located on the left side and reproduces the left signal of a recorded sound and directs it into the passenger space and the other one of the two said speakers is located on the right side and reproduces the right signal and directs it into the passenger space, a third speaker located in the front end region of the passenger space and in front of the seats in the passenger space, means for supplying said third speaker with an electrical summation signal of the left and right signals, and at least one rear speaker located in the rear end region of the passenger space, and means for supplying the electrical differential signal ($S=L-R$ and $S=R-L$, respectively) of said right and left signals to said at least one rear speaker, at least two said rear speakers are located in said rear end region and one of said rear speakers supplied with the differential signal has an approximately figure-8-shaped radiation pattern and the main radiation direction is oriented approximately at a right angle to and horizontally relative to the central longitudinal axis of the passenger space and, another said rear speaker is a non-directional speaker located adjacent to said rear speaker supplied with the differential signal and said another rear speaker is supplied with a summation signal formed from the signals of the middle and low frequencies.

3. Stereophonic reproduction system, as set forth in claim 2 wherein at least two said rear speakers are located in the rear end region and spaced laterally apart with one said rear speaker located on the left side and another said rear speaker located on the right side of the rear end region, said means for supplying the electrical differential signal supplies the differential signal to said left side and right side rear speakers and the differential signal for said left side rear speaker has the portion of the differential signal from the left signal stronger than the portion of the signal from the right signal and the differential signal for said right side rear speaker has the portion of the differential signal from the right signal stronger than the portion of the left signal.

4. Stereophonic reproduction system as set forth in claim 2, wherein said one rear speaker supplied with the differential signal and said another rear speaker are arranged one behind the other in the direction of the longitudinal axis of the passenger space.

5. Stereophonic reproduction system as set forth in claim 2 or 1, wherein each said rear speaker has an electronic delay device connected thereto.

6. Stereophonic reproduction system as set forth in claim 5, wherein said electronic delay device is a so-called bucket brigade device.

* * * * *